United States Patent [19]

Buist et al.

[11] Patent Number: 4,545,556
[45] Date of Patent: Oct. 8, 1985

[54] TERMINAL ELEVATING MECHANISM

[75] Inventors: Kevin S. Buist, New Brunswick; Thomas A. Kachnowski, Flemington, both of N.J.

[73] Assignee: Burroughs Corporation, Detroit, Mich.

[21] Appl. No.: 520,837

[22] Filed: Aug. 5, 1983

[51] Int. Cl.⁴ ............................................ A47B 91/00
[52] U.S. Cl. .................................... 248/346; 248/650
[58] Field of Search ................ 248/346, 188.2, 188.3, 248/188.4, 650, 157, 359 C, 649; 108/144, 147; 358/254

[56] References Cited

U.S. PATENT DOCUMENTS

| | | | |
|---|---|---|---|
| 2,415,820 | 2/1947 | Herring | 108/147 X |
| 2,534,169 | 12/1950 | Hope | 211/59.3 |
| 2,696,961 | 12/1954 | Fox | 248/650 |
| 3,305,876 | 2/1967 | Hutt | 108/147 X |
| 3,789,140 | 1/1974 | McQueen et al. | 358/254 |
| 3,970,792 | 7/1976 | Benham et al. | 248/183 X |
| 4,303,162 | 12/1981 | Suttles | 211/59.3 |
| 4,349,173 | 9/1982 | Volka | 248/346 |
| 4,415,136 | 11/1983 | Knoll | 248/663 X |

FOREIGN PATENT DOCUMENTS

| | | | |
|---|---|---|---|
| 871841 | 7/1961 | United Kingdom | 248/188.2 |
| 2022995 | 12/1979 | United Kingdom | 108/147 |

Primary Examiner—J. Franklin Foss
Attorney, Agent, or Firm—Kevin R. Peterson; Edmund M. Chung; Robert A. Green

[57] ABSTRACT

Apparatus for raising and lowering a terminal comprising a support plate having a top surface to which a terminal is secured and a bottom surface to which are secured two cross bars mounted on a threaded shaft which moves the cross bars toward and away from each other. Four pivotable legs are positioned with respect to the cross bars so that movement of the bars in one direction pivots the legs to raise the support plate and its terminal, and movement of the bars in the opposite direction pivots the legs to lower the support plate and its terminal.

1 Claim, 3 Drawing Figures

TERMINAL ELEVATING MECHANISM

BACKGROUND OF THE INVENTION

Electronic data processing terminals have come into wide use in recent years. In general, such terminals include a monitor cabinet having a cathode ray tube and perhaps an attached keyboard and other associated electronic apparatus. Recently, the question of operator comfort has become important, and one facet of this question relates to the height of the terminal cabinet and the ability of the operator to adjust the height of the cabinet.

The requirement is to be able to raise and lower a relatively heavy monitor with ease, with minimum manipulation by the user, and, when lowered, the lifting mechanism should have minimum height. The present invention satisfies these requirements in a height adjustment mechanism for a terminal display cabinet.

DESCRIPTION OF THE INVENTION

Figure 1:
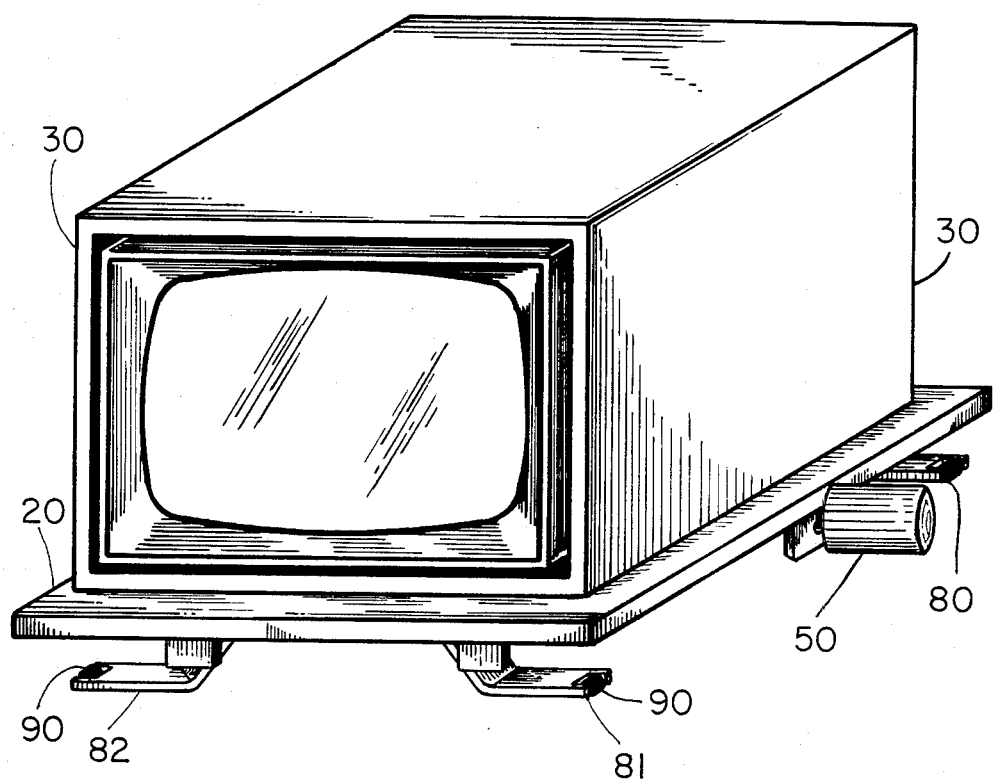
FIG. 1 is a perspective view of a portion of the apparatus of the invention and a terminal carried thereby.
Figure 3:
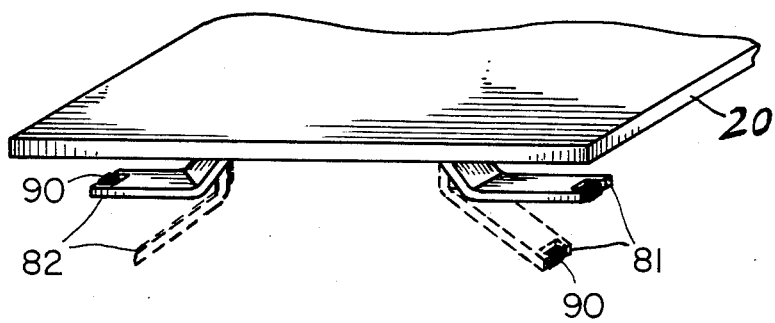
FIG. 3 is a view of a portion of the apparatus of FIG. 1 illustrating its operation.
Figure 2:
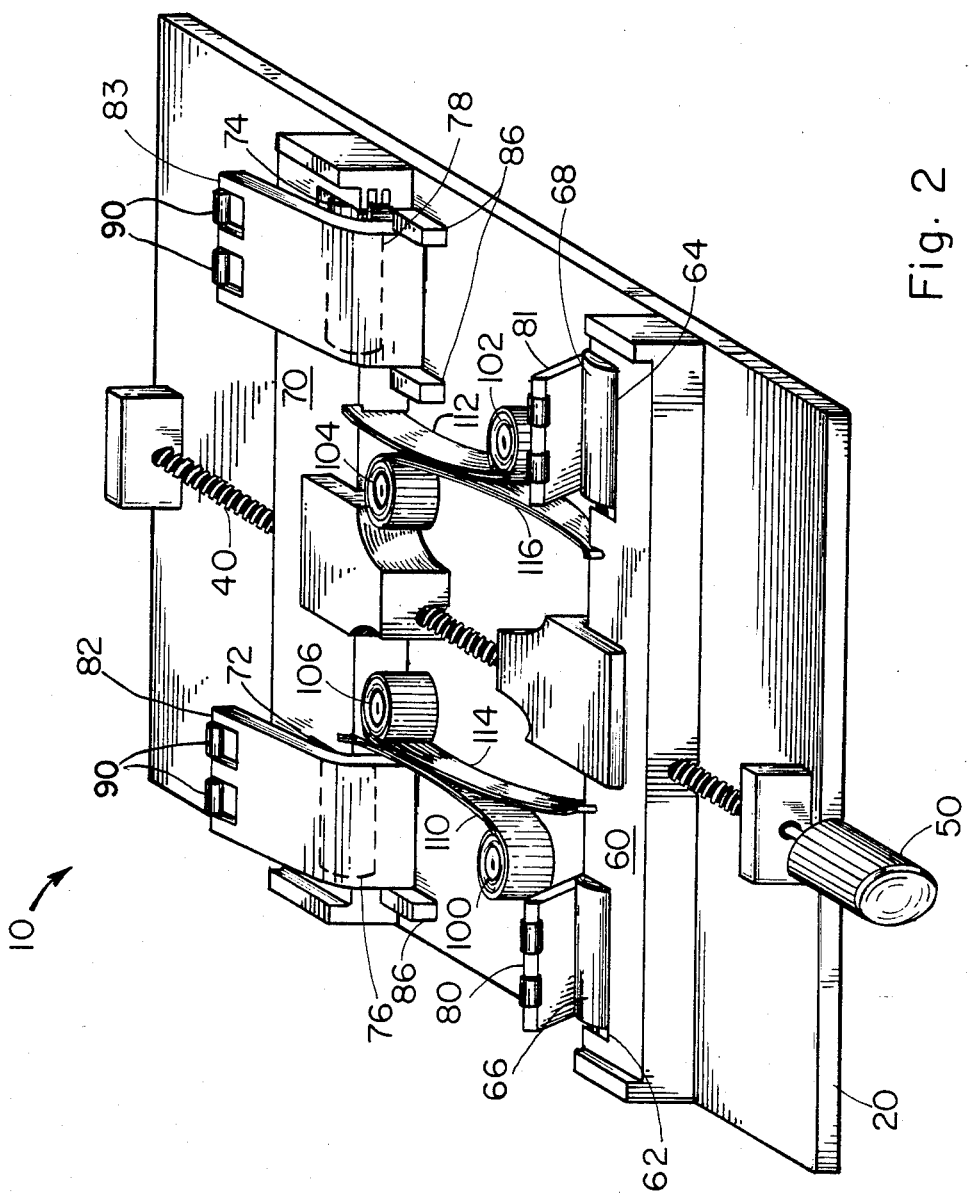
FIG. 2 is a perspective view of the underside of the support apparatus of FIG. 1 showing the features of the invention.

The elevating support apparatus of the invention 10 includes a rigid large-area support plate 20 for supporting a cathode ray tube monitor 30 or computer terminal or the like on its top surface. The bottom surface of the plate (shown in FIG. 2) carries elevating apparatus including a threaded shaft 40 oriented on the longitudinal axis of the plate. The shaft carries an operating knob 50 at one end.

The shaft 40 is threaded through a first horizontal cross bar 60 and a second horizontal cross bar 70 which are disposed parallel to each other on the bottom surface of plate 20 and slide thereon. The bars 60 and 70 are spaced apart on the shaft 40, and, as the shaft turns, the cross bars 60 and 70 move either toward or away from each other.

The first cross bar 60 has left and right notches 62 and 64 in its front surface, and rollers 66 and 68 are mounted so that they are free to rotate in the respective notches. Similarly, the second cross bar 70 has left and right notches 72 and 74 in its front surface, and rollers 76 and 78 are mounted to allow free rotation in the respective notches.

The rollers 66 and 76 are aligned on an axis, and the rollers 68 and 78 are aligned on an axis, both axes being perpendicular to shaft 40. Just in front of each roller is a support leg, there being four legs 80, 81, 82, and 83, each support leg having one end pivotably mounted on blocks 86. The support legs are slightly bent or curved so that, when the elevating device 10 is in its lowermost position, the cross bars 60 and 70 are closest to each other and the rollers are closest to the portions of the legs 80, 81, 82, 83 which are connected to the brackets 86.

The legs 80, 81, 82, and 83 carry rollers 90 at their free ends so that they roll freely on a support surface on which the apparatus is seated and provide minimal frictional drag on the support surface.

Four leaf spring assemblies are provided to assist the operation of the apparatus 10 in raising and lowering a terminal. These assemblies include a spool 100 which is mounted vertically and rotatably on a post adjacent to cross bar 60 and leg 80. A leaf spring 110 is wound around the spool several times and extends directly to the cross arm 70, to which it is secured adjacent to the leg 82. A second spool 106 is rotatably mounted adjacent to cross bar 70, and a leaf spring 114 is wound around it and extends adjacent to leaf spring 110 directly to cross bar 60 to which it is secured adjacent to leg 80. A similar pair of spools 102 and 104 and leaf springs 112 and 116 are mounted on the other side of shaft 40 as shown.

In operation of the apparatus 10, when the cross bars 60 and 70 are spaced apart and the bars are flat, the plate and its load are in the lowest position resting on table 120. Then rotation of the knob 50 and the shaft 40 drives the cross bars 60 and 70 toward each other and allows the leaf springs to retract on their spools to assist the lifting operation. As the cross bars move toward each other, the rollers 66, 68, 76, and 78 bear against the legs 80–83 and cause the legs to pivot and to press against the table on which the terminal is seated and thus to push the plate and its load upwardly and thus to elevate it. Rotation of knob 50 in the opposite direction lowers the assembly and its terminal.

It is noted that having curved legs 80, 81, 82, 83 reduces the amount of operator manipulation of the knob 50 which is required to operate the apparatus and raise or lower the terminal carried thereby. A shorter travel distance of the cross bars 60 and 70 is required to raise the curved leg fully than, for example, a straight leg.

In addition, the leaf springs act as a counter-balance and pull the cross bars 60 and 70 toward each other, thus permitting an operator to manipulate knob 50 and achieve the desired lifting operation with minimum effort.

What is claimed is:

1. A terminal lifting apparatus comprising
   a large-area support plate having a top surface which carries a terminal, and a bottom surface which is adapted to be disposed adjacent to a support table,
   a first cross bar and a second cross bar mounted parallel to each other adjacent to the lower surface of said plate,
   a threaded shaft coupled to said first and second cross bars for driving them toward and away from each other, said cross bars being transverse to said shaft,
   a first spool and a second spool, both rotatably supported on said support plate on one side of said shaft,
   said first spool being mounted close to said first cross bar and said second spool being mounted close to said second cross bar,
   a first leaf spring having one end wound around said first spool and the other end secured to said second cross bar,
   a second leaf spring having one end wound around said second spool and the other end secured to said first cross bar,
   a third spool and a fourth spool, both rotatably supported on said support plate on the other said of said shaft,
   said third spool being mounted close to said first cross bar, and said fourth spool being mounted close to said second cross bar, a third leaf spring having one end wound around said third spool and the other end secured to said second cross bar,
a fourth leaf spring having one end wound around said fourth spool and the other end secured to said first cross bar, and
a plurality of support legs pivotably secured to said support plate in front of said cross bars and resting on said cross bars so that, as the cross bars are driven toward and away from each other, the legs pivot and bear against a support table to raise and lower the terminal with respect to the user.

* * * * *